UNITED STATES PATENT OFFICE.

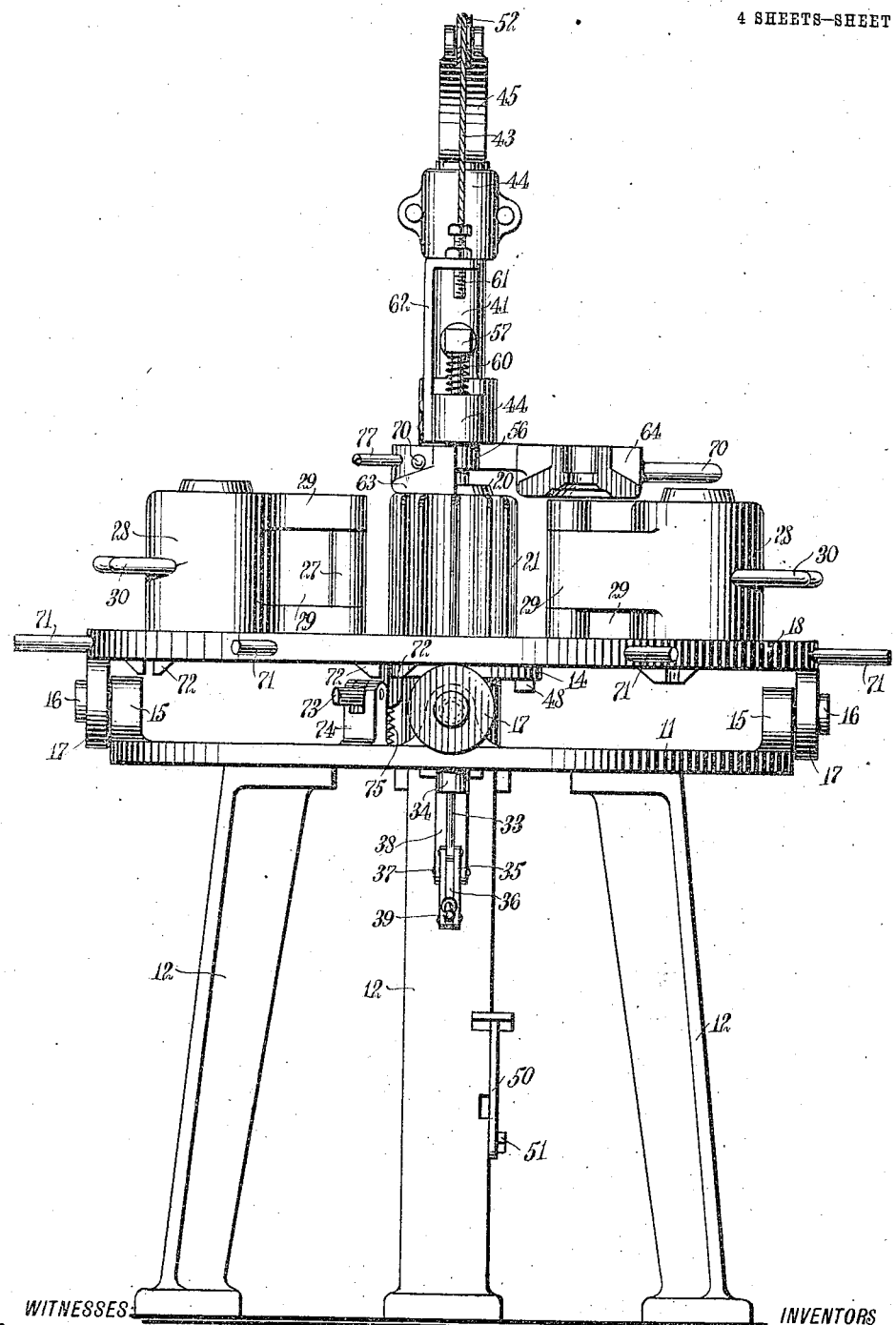

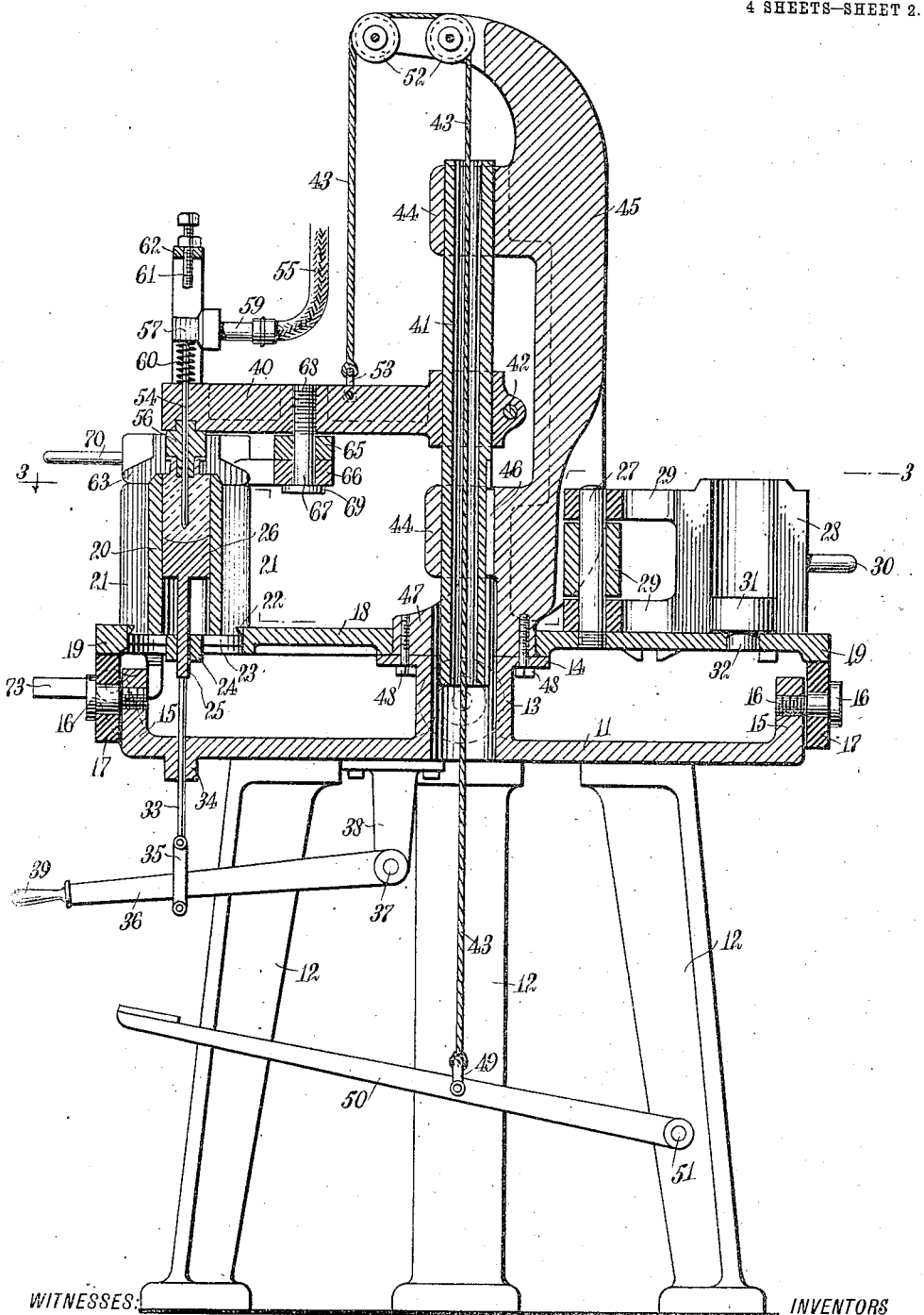

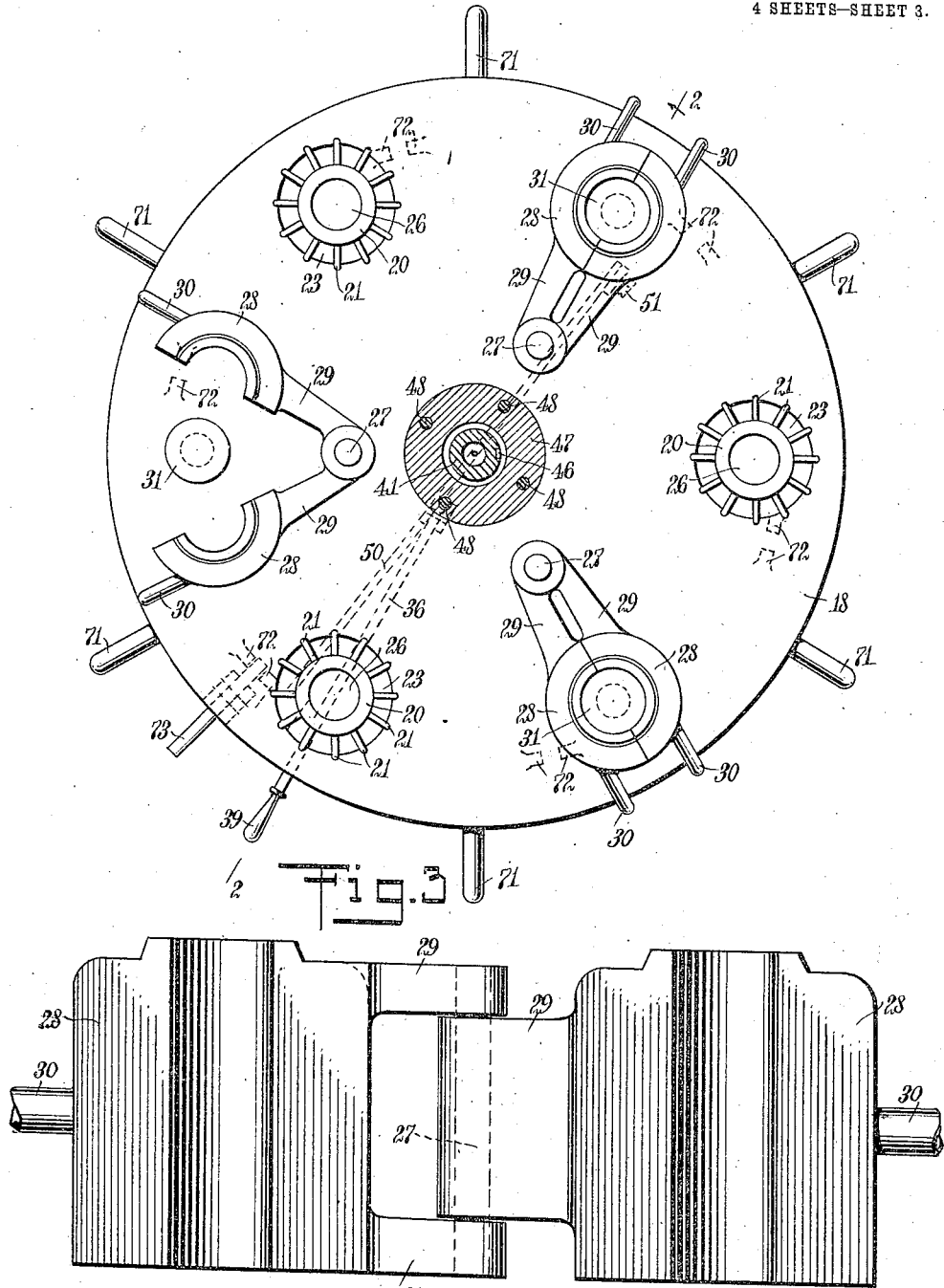

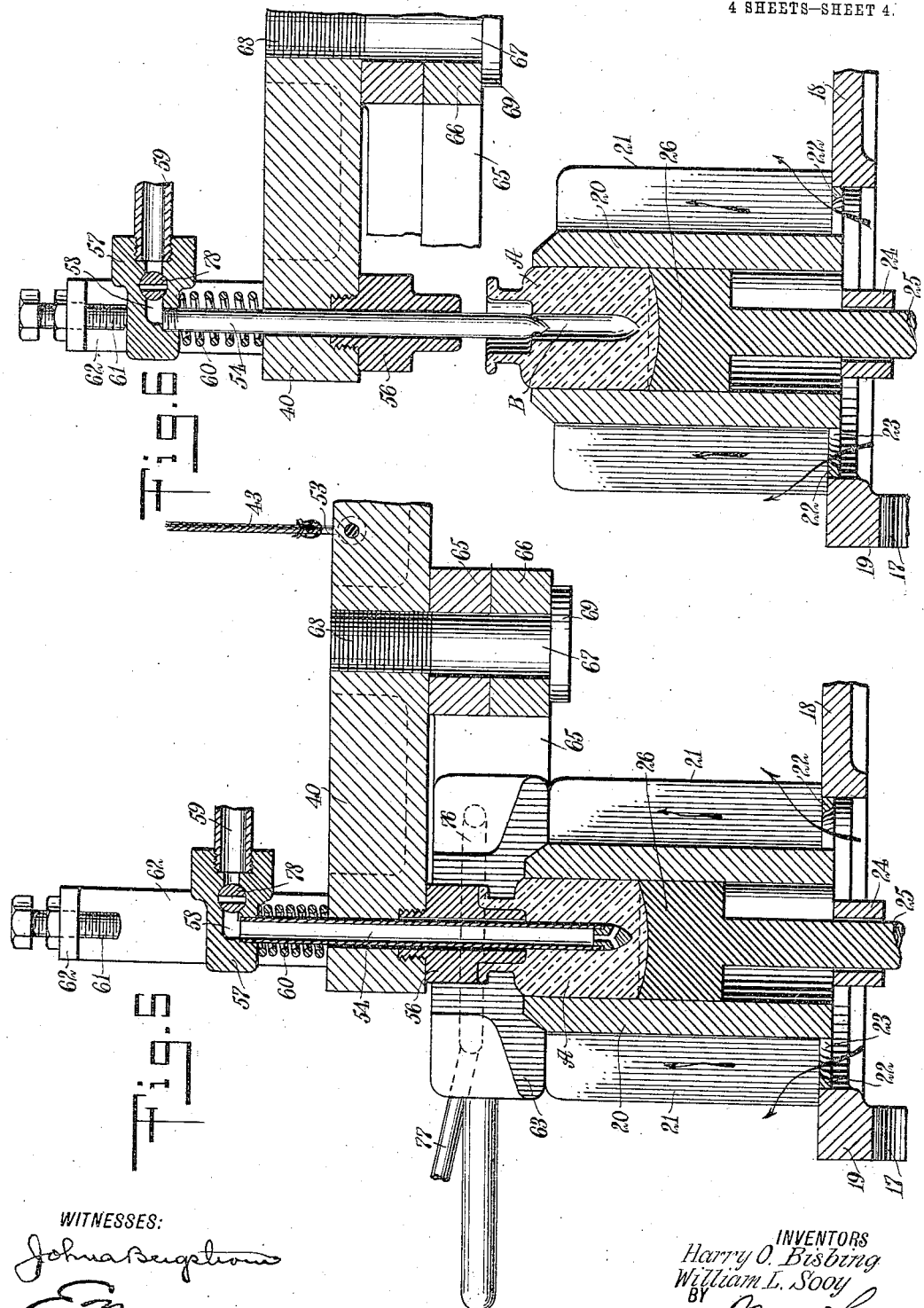

HARRY O. BISBING AND WILLIAM L. SOOY, OF COSHOCTON, OHIO.

APPARATUS FOR MOLDING BOTTLES.

988,165.  Specification of Letters Patent.  Patented Mar. 28, 1911.

Application filed August 6, 1910. Serial No. 575,891.

*To all whom it may concern:*

Be it known that we, HARRY O. BISBING and WILLIAM L. SOOY, citizens of the United States, and residents of Coshocton, in the county of Coshocton and State of Ohio, have invented a new and Improved Apparatus for Molding Bottles, of which the following is a full, clear, and exact description.

Among the principal objects which the present invention has in view are: to provide a machine of the character set forth with a revoluble molding table having a series of molds thereon; to provide a reciprocating head having mounted thereon a blowing pipe and a parting mold for shaping the necks of bottles; to provide means for elevating and depressing said reciprocating head; and to provide a machine the construction of which is simple, economical and durable.

One embodiment of the present invention is disclosed in the structure illustrated in the accompanying drawings, in which like characters of reference denote corresponding parts in all the views, and in which—

Figure 1 is a front elevation of a machine constructed and arranged in accordance with the present invention; Fig. 2 is a vertical section taken on the line 2—2 in Fig. 3; Fig. 3 is a horizontal section taken on the line 3—3 in Fig. 2; Fig. 4 is a detail view, on an enlarged scale, of the bottle body mold; Fig. 5 is a detail view, fragmentary in form, showing in section the body mold, neck mold and reciprocating head in operative position; and Fig. 6 is a similar view showing the bottle as completed in the molds, the neck mold as removed and the reciprocating head as partly lifted.

The supporting table 11 is suitably mounted upon legs 12, 12, and is provided with a central pedestal 13. The pedestal 13 is provided at the upper end with an annular flange 14 which serves the double purpose of supporting the molding table in sliding relation and for holding the elevator crane for the reciprocating head. Disposed at the outer edge of the table 11, and vertically extended thereon, are lugs 15, 15. The lugs 15, 15 are suitably tapped to receive the screw threaded sections of bolts 16, 16. The bolts 16, 16 have a bearing section upon which are rotatively mounted supporting rollers 17, 17. The rollers 17, 17 serve to support the outer edge of a molding table 18, a depending flange 19 being provided to form a surface which may be machined accurately to form a track for the operation of the said table.

The molding table 18 is provided with a plurality of bottle body molds preferably arranged in two series, one series comprising blank molds in which the neck of the body is formed, and the body molds wherein the body of the bottle is shaped by being blown to conform to the said molds. The blank molds comprise a solid cylindrical body portion 20, having extended therefrom a series of radiating fins 21, 21. Each mold is held stationarily upon the table 18 by the fins 21 resting upon the top of the said table, and by a ring 22 which is set within angular recesses formed in the said fins, which ring is fixedly mounted in an opening 23 formed in the table 18. Extended across the said openings 23 are cross bars 24 having a perforation formed therein concentric with the opening 23 and with the center of the body portion 20. The perforation formed in the bar 24 is to provide a guide for a piston rod 25. The piston rod 25 is rigidly or integrally connected with a piston head 26, which piston head forms the bottom of the body portion 20 and forms therewith a receptacle for the molten glass when the same is delivered thereto. The body molds forming the second series are two-part molds, and are pivotally mounted upon pivot pins 27, 27. The body portions 28 of the said molds are provided with elongated hinge arms 29, 29 provided to receive the pins 27, and to hold the body portions 28, and to form a radius for the swing of the said body portion to provide for the opening of the two parts of the molds on arcs, the curves of which are substantially diametric to the inner cylinder of the body portion 28. The body portions 28 are provided with handles 30, 30 arranged, as shown in Fig. 3 of the drawings, so that the mold sections may be parted as and when desired. Each of the said molds is provided with a piston, the pistons of the blank molds being indicated by the numerals 26 and the pistons of the body molds being indicated by the numerals 31, 31. The upper face of each of the pistons 26 is hollow, substantially as shown in Fig. 2 of the drawings, to assist in the function performed by the said piston of lifting the molten glass to the top of the body portion 20. The pistons 31 are shaped at the top surface to the form desired for the bottom of the bottle. Each of the pistons is provided with a piston rod, the piston rods of the pistons 26 being indicated by the numeral 25 and the piston rods of the pistons 31 being indicated by the numeral 32. Disposed in the path of the piston rods 25 and 32 is a plunger 33 guidably mounted in a perforation formed in the table 11 and in a boss 34 depended from the under surface thereof. The plunger 33 is fixedly connected by means of a link 35 with a lever 36. The lever 36 is pivotally mounted at 37 upon a bracket 38 extended from the under side and bolted to the table 11. The lever 36 is provided with a hand hold 39 whereby the said lever is pumped by the operator to raise and lower the said plunger 33.

A cross head 40 is adjustably mounted in fixed relation upon a guide rod 41, to which it is secured by a bolt 42. The guide rod 41 is tubular in form and open-ended to provide a passage for a cable 43. The rod 41 is slidably mounted in perforations formed in brackets 44, 44 extended from the side of an elevator crane 45. The said rod is non-rotatively held in the brackets 44 by means of a feather 46 suitably mounted in grooves provided in the said brackets and said bar. The crane is provided with a cylindrical foot 47 which is trued to form a pivot on which the table 18 rotates. The foot 47 of the crane 45 is rigidly mounted on the pedestal 13 and the flange 14 thereof by being bolted thereto by bolts 48, 48. The cable 43 is secured by an eyelet 49 to a foot lever 50. The foot lever 50 is pivotally mounted at 51 in one of the legs 12. The cable 43 is reeved over sheaves 52, 52, supported in the end of the crane 45, and is then anchored to an eyelet 53 pivotally mounted in the cross head 40. It is by means of the cable 43 and lever 50 that the cross head 40 is elevated and lowered.

Upon the cross head 40 is carried a blow pipe 54 and a compressed air pipe 55 designed for blowing the bottle body when the glass is held within the body molds 28. The blow pipe 54 is guided by a block 56, the lower end whereof is projected to form the core for shaping the neck passage of the bottle. The upper end of the pipe 54 is rigidly connected with a connecting block 57, which block is provided with an annular passage 58, the one end whereof opens into a nipple 59 to which is coupled the pipe 55. Infolding the pipe 55 is a spiral spring 60, the ends whereof rest upon the cross head 40 and the block 57, and operate normally to support the said block 57 above the cross head 40. To limit the lift of the block 57, a set bolt 61 is provided in a standard 62, as seen in Figs. 1, 5 and 6 of the drawings.

Pivotally mounted upon the cross head 40 is the bottle neck mold. The neck mold is a two piece mold formed of two equal half sections 63 and 64. When joined the sections 63 and 64 are shaped to produce an inner molding surface adapted to form the outer surface of the neck, and to form, in conjunction with the block 56, a completed neck for the bottle. The said mold sections are provided with hinge arms 65 and 66, the ends whereof are perforated to be rotatively mounted upon a pivot bolt 67. The pivot bolt 67 is provided with a screw threaded end section 68 to engage in holding relation the cross head 40, and with an extended flat head 69 to rest under and support the said mold sections 63 and 64. The said mold sections are opened and closed in clamping relation upon the block 56, and for this purpose they are provided with handles 70, 70.

The table 18 is preferably rotated by hand, and for this purpose there is provided a series of spokes 71, 71, laterally extended from the periphery of the said table. For the purpose of alining the table so that the molds above described will register with the cross head 40, the table is provided with a series of lugs 72, separated to form slots to receive the detent head of a locking lever 73. The locking lever 73 is mounted on a standard 74 extended from the table 11, as shown particularly in Fig. 1 of the drawings. The head of the lever 73 is held upward against the table 18 by means of a spiral spring 75, suitably disposed to accomplish this purpose. When now the table 18 is rotated, it is automatically arrested at each of the registering stations where the molds 20 and 28 aline with the cross head 40 and the neck mold sections 63 and 64 mounted thereon.

It is to provide for cooling the sections 63 and 64 that each is provided with a semicircular passage 76, which is supplied with cooled water through a pipe 77. A similar pipe to carry off the water as heated is extended from the opposite end of the said passage 76. In this manner the sections 63 and 64 are maintained in condition to chill the glass forming the neck of the bottle. This is essential, as in the operation the neck thus formed provides a supporting structure for the glass while being transferred from the blank molds or body portion 20 thereof to the body forming molds or body portion 28 thereof.

The operation of the machine is as follows: Glass in liquid condition is poured into the blank molds and the body portion 20 thereof to rest upon the piston 26 therein. This operation is performed successively as the various molds of the character mentioned are delivered in the rotation of the table 18 to the supply station. When the blank mold thus provided with molten glass is rotated to aline with the cross bar 40, the lever 50, which has been depressed, is released to allow the cross head 40 to descend above the mold 20. The neck mold sections 63 and 64 are drawn together by the handles 70 upon the block 56. The said sections 63 and 64 and block 56 thus arranged fit snugly upon the body portion 20 and form a perfect closure therefor. In this position the lever 36 and the plunger 33 carried thereby are lifted to raise the piston 26 until the glass flows around the core end of the block 56 and into the mold formed by the sections 63 and 64. While in this position the pipe 54 is depressed to form a passage B in the glass A of the body portion of the said glass. The contact of the hot glass with the cooled sections 63 and 64 quickly congeals the glass comprising the neck of the completed bottle. The lever 50 is now depressed, lifting, by means of the cable 43, the cross head 40, and carrying upward therefrom the hot glass A. The table 18 is quickly rotated until the body mold is alined with the cross head 40. The body mold is in spread position, and in this position the lever 50 is released to allow the cross head to sink to its proper level, when the body of glass A will be in position above the piston 31. In this position the sections forming the body mold 28 are closed, the handles 30, 30 being used therefor to surround the said glass A. It will be noticed by reference to the drawings that the inner diameters of the body portion 20 and the body portion 28 vary, the former being considerably smaller. This insures the glass from which the body of the bottles is to be formed from being crowded or chilled by contact with the sides of the mold 28. In this position, the neck molds being still in holding relation upon the neck of the bottle, the cock 78 is turned to open the passage from the nipple 59 to the pipe 54. The compressed air is thus introduced into the passage B formed in the glass body A, and the blowing of the body of the bottle is augmented. As the body of the bottle is gradually expanded to fill the mold 28, the pipe 54 is gradually lowered, the nose of the said pipe being maintained free to contact with the molten glass. During the operation, if it be desired, the piston 31 is raised by means of the lever 36 so that the mold for the bottom of the completed bottle is more firmly impressed thereon.

At the end of the operation it will be found that a completed bottle, having a molded neck of exact dimensions, will be formed, having a blown body, and the outer shape of which conforms in all particulars to the interior of the mold 28.

Having thus described our invention, what we claim as new and desire to secure by Letters Patent is:—

1. An apparatus for molding bottles, comprising a rotary table; a supporting table for said rotary table having a series of carrying wheels pivotally mounted thereon and upwardly extended to support said rotary table; a series of blank molds and body molds disposed on said rotary table in the same rotary path, said molds being alternately disposed; a two-part neck mold disposed in the path of said body molds and above the same, said neck mold being arranged to register with said body molds; a reciprocating mechanism for raising and lowering said neck mold to close each of said body molds; an air blowing mechanism embodying a blow pipe carried by said reciprocating mechanism; a lifting bottom for each of said molds; and an elevating mechanism for lifting the plastic glass into said neck mold.

2. An apparatus for molding bottles, comprising a rotary table having a series of openings; a supporting table for said rotary table having a series of carrying wheels pivotally mounted thereon and upwardly extended to support said rotary table; a blank mold having a solid body and radiating fins extended from the sides of said body and resting over said openings; a body mold embodying two half hinged sections provided with handles for manipulating the said sections; a plurality of disks slidably mounted on said table to move perpendicularly therein, said disks adapted to form the bottoms of said molds; a two-part neck mold disposed in the path of said body mold and above the same, said neck mold being arranged to register with said body mold; a reciprocating mechanism for raising and lowering said neck mold to close said body mold; and an air blowing mechanism embodying a blow pipe carried by said reciprocating mechanism.

In testimony whereof we have signed this specification in the presence of two subscribing witnesses.

HARRY O. BISBING.
WILLIAM L. SOOY.

Witnesses:
L. D. SCHOTT,
ESTELLA MIRISE.